US00RE40392E

(19) United States
(12) Reissued Patent
Rymer et al.

(10) Patent Number: US RE40,392 E
(45) Date of Reissued Patent: Jun. 24, 2008

(54) ELECTRIC EVAPORATOR DEVICE

(75) Inventors: Shaun Patrick Rymer, Beverley (GB); Andrew Robert McLeish, deceased, late of Sheffield (GB); by Barbara Jenman, legal representative, Sheffield (GB); Ruben Garcia, Barcelona (ES)

(73) Assignee: Reckitt Benckiser (UK) Limited, Berkshire (GB)

(21) Appl. No.: 29/169,506

(22) Filed: Oct. 17, 2002

Related U.S. Patent Documents

Reissue of:
(64) Patent No.: Des. 432,222
Issued: Oct. 17, 2000
Appl. No.: 29/109,461
Filed: Jun. 16, 1999

(30) Foreign Application Priority Data

Feb. 25, 1999 (GB) ..... 2081475

(51) LOC (8) Cl. ..... 23-04
(52) U.S. Cl. ..... D23/366; D23/360
(58) Field of Classification Search ..... D23/366–369, D23/356–363; 392/390; 239/135, 136, 58; 261/DIG. 17, DIG. 5, DIG. 65; 96/97
See application file for complete search history.

(56) References Cited

U.S. PATENT DOCUMENTS

| | | | | | |
|---|---|---|---|---|---|
| D67,807 | S | | 7/1925 | Kammer | |
| D228,387 | S | * | 9/1973 | Costello | D23/360 |
| D246,986 | S | * | 1/1978 | Costello | D23/360 |
| 5,038,394 | A | | 8/1991 | Hasegawa et al. | |
| 5,095,647 | A | | 3/1992 | Zobele et al. | |
| D335,530 | S | | 5/1993 | Schimanski | |
| 5,222,186 | A | | 6/1993 | Schimanski et al. | |
| D349,157 | S | * | 7/1994 | Rymer | D23/362 |
| 5,647,053 | A | | 7/1997 | Schroeder et al. | |
| D386,974 | S | | 12/1997 | Wefler | |
| D393,063 | S | | 3/1998 | Wefler | |
| D400,662 | S | * | 11/1998 | Davis | D23/366 |
| D403,419 | S | * | 12/1998 | Davis | D23/366 |
| 6,104,867 | A | | 8/2000 | Stathakis et al. | |
| D433,744 | S | | 11/2000 | Basaganas | |

(Continued)

FOREIGN PATENT DOCUMENTS

| | | | |
|---|---|---|---|
| EP | 0 362 397 | A1 | 4/1990 |
| EP | 0 420 144 | A1 | 4/1991 |
| EP | 0 736 248 | A1 | 10/1996 |
| GB | 2 194 442 | A | 3/1998 |
| WO | WO 98/19526 | A1 | 5/1998 |
| WO | WO 98/58692 | A1 | 12/1998 |

*Primary Examiner*—Lisa Lichtenstein
(74) *Attorney, Agent, or Firm*—Panitch Schwarze Belisario & Nadel LLP

(57) CLAIM

The ornamental design for an electric evaporator device, as shown and described.

DESCRIPTION

FIG. 1 is a right side and front perspective view of an electric evaporator device showing our new design;
FIG. 2 is a right side view thereof;
FIG. 3 is a front view thereof;
FIG. 4 is a rear view thereof;
FIG. 5 is a top plan view thereof; and,
FIG. 6 is a bottom plan view thereof.
The broken [line showing of environment structure in FIGS. 1, 2, and 4–6, is] *lines in the figures are* for illustrative purposes only and [forms] *form* no part of the claimed design.

1 Claim, 2 Drawing Sheets

Matter enclosed in heavy brackets [ ] appears in the original patent, but forms no part of this reissue; matter printed in italics indicates the additions made by reissue.

*AMENDED*

U.S. PATENT DOCUMENTS

| | | | |
|---|---|---|---|
| D437,636 | S | 2/2001 | Basagañas |
| 6,236,807 | B1 | 5/2001 | Ruffolo et al. |
| D444,220 | S | 6/2001 | Basagañas |
| 6,278,840 | B1 | 8/2001 | Basagañas Millan |
| 6,285,830 | B1 | 9/2001 | Basagañas Millan |
| 6,466,739 | B2 | 10/2002 | Ambrosi et al. |

* cited by examiner

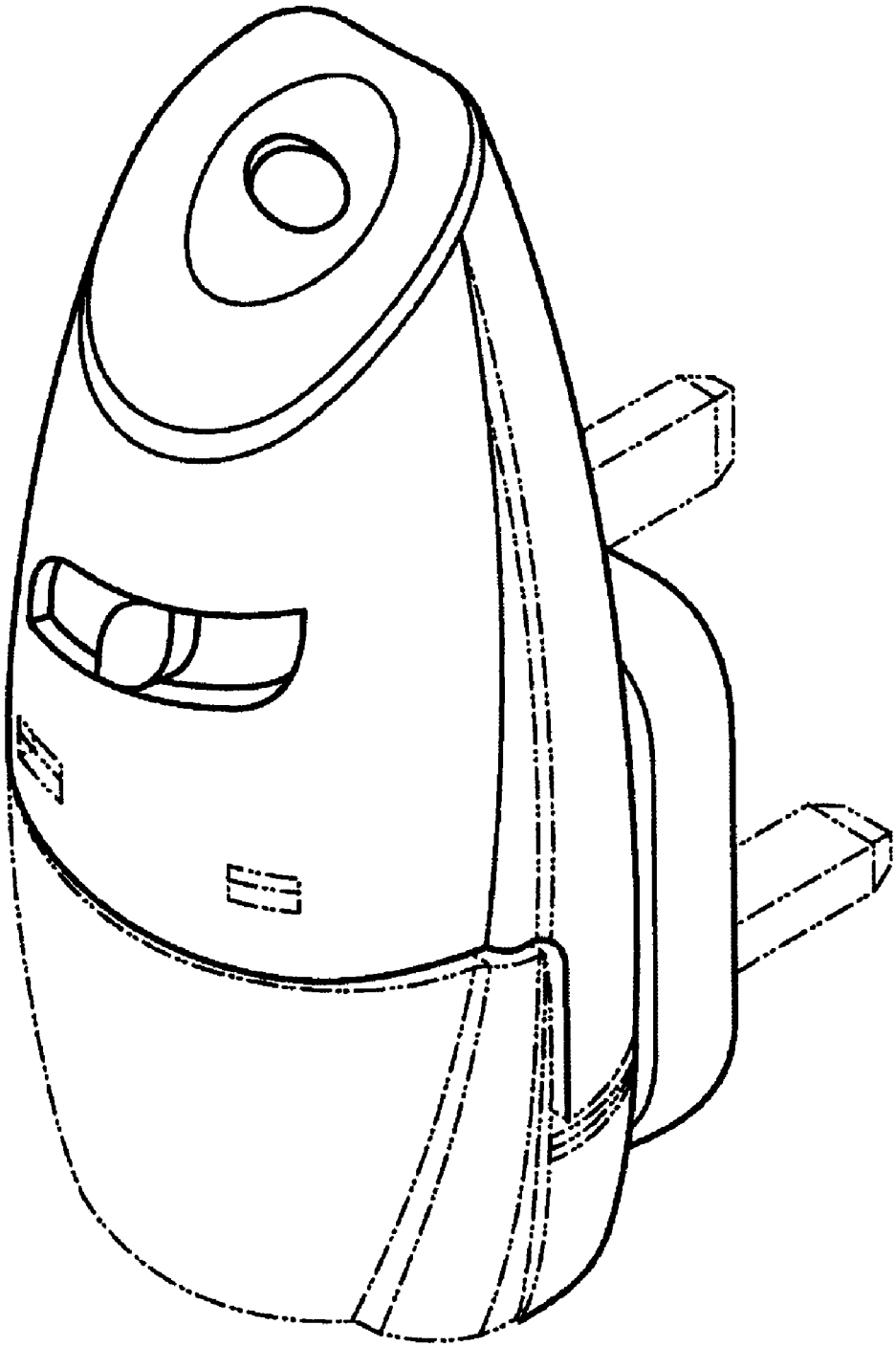
FIG. 1
AMENDED

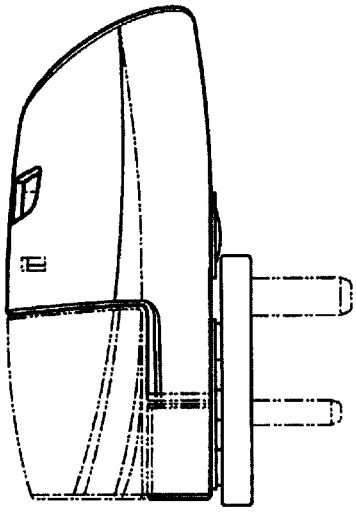
FIG. 2
AMENDED
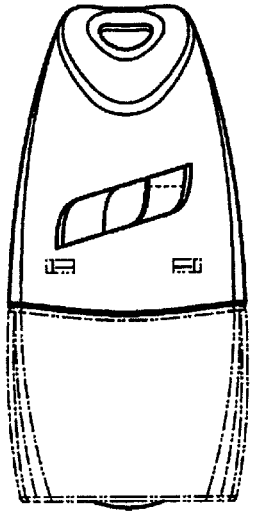
FIG. 3
AMENDED
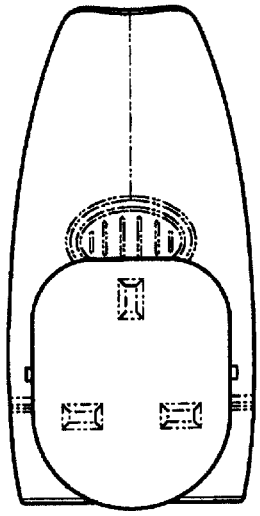
FIG. 4
AMENDED
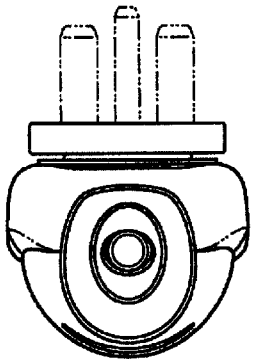
FIG. 5
AMENDED
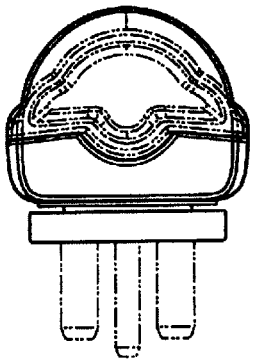
FIG. 6
AMENDED